«12» United States Patent
Cox

«11» Patent Number: 6,081,867
«45» Date of Patent: Jun. 27, 2000

«54» SOFTWARE CONFIGURABLE TECHNIQUE FOR PRIORITIZING INTERRUPTS IN A MICROPROCESSOR-BASED SYSTEM

«75» Inventor: Steven R. Cox, San Jose, Calif.

«73» Assignees: Sony Corporation, Tokyo, Japan; Sony Electronics, Inc., Park Ridge, N.J.

«21» Appl. No.: 09/082,432

«22» Filed: May 20, 1998

«51» Int. Cl.[7] .................................................. G06F 9/46
«52» U.S. Cl. .......................... 710/264; 710/260; 710/261; 710/262; 710/263; 710/265; 710/266; 710/268; 710/269
«58» Field of Search ................................ 712/1; 710/266, 710/260, 268, 49, 261, 262, 263, 264, 265, 267, 269

«56» References Cited

U.S. PATENT DOCUMENTS

| 5,619,706 | 4/1997 | Young | 710/268 |
|---|---|---|---|
| 5,768,599 | 6/1998 | Yokomizo | 710/260 |
| 5,778,236 | 7/1998 | Gephardt et al. | 710/266 |
| 5,787,290 | 7/1998 | Capps, Jr. et al. | 710/260 |
| 5,805,929 | 9/1998 | Connolly et al. | 710/49 |
| 5,819,095 | 10/1998 | Capps, Jr. et al. | 710/260 |
| 5,905,898 | 5/1999 | Quereshi et al. | 710/266 |
| 5,918,057 | 6/1999 | Chou et al. | 710/260 |

OTHER PUBLICATIONS

Kane, Gerry; Heinrich, Joe, "MIPS RISC Architecture," 1992, Pub. by Prentice Hall, Upper Saddle River, NJ (a textbook, submitted in its entirety).
"M68000 8–/16/32 Microprocessors User's Manual," 9th Ed., 1994, (distributed by, and available from, Motorola Literature Division, AZ) (submitted in its entirety).
"MC68020 MC86EC020 Microprocessors User's Manual," 1st Ed., 1992, (distributed by, and available from, Motorola Literature Division, AZ) (submitted in its entirety).
"MC68030 Enchanced 32–Bit Microprocessor User's Manual," 3rd Ed., 1990, (distributed by, and available from, Motorola Literature Division, AZ) (submitted in its entirety).

*Primary Examiner*—Meng-Ai T. An
*Assistant Examiner*—Nabil El-Hady
*Attorney, Agent, or Firm*—Haverstock & Owens LLP

«57» ABSTRACT

A software configurable technique for prioritizing and masking interrupts in a microprocessor-based system. Contents of a first plurality of registers map each of a plurality of interrupts to an appropriate one of a second plurality of registers and indicate which interrupts are masked. The second plurality of registers are arranged in a predetermined priority and each contains the starting address of an appropriate interrupt service routine for the corresponding interrupt. The interrupt signals are mapped to the outputs of a plurality of logical "OR" gates according to the contents of the first plurality of registers by a plurality of de-multiplexers coupled to the inputs of the plurality of logical "OR" gates. Each logical "OR" gate corresponds to one of the second plurality of registers. A plurality of logical "AND" gates are coupled to the outputs of the logical "OR" gates so as to allow only the highest priority enabled interrupt signal to enable the corresponding one of the second plurality of registers. The vector address stored in the enabled register is placed on a vector address bus for the microprocessor which places the vector address in its program counter. The microprocessor is then is interrupted and begins executing the appropriate interrupt service routine beginning at the appropriate vector address. The present invention provides readily configurable interrupts by altering the contents of the first and second plurality of registers.

14 Claims, 7 Drawing Sheets

SOFTWARE CONFIGURABLE TECHNIQUE FOR PRIORITIZING INTERRUPTS IN A MICROPROCESSOR-BASED SYSTEM

FIELD OF THE INVENTION

The invention relates to the field of microprocessor-based systems. More particularly, the invention relates to configuring and prioritizing interrupts in microprocessor-based systems.

BACKGROUND OF THE INVENTION

Microprocessor-based systems generally operate by sequentially executing instructions of a software program stored in consecutive memory locations. A program counter contains a memory address of a next stored instruction in the sequence. The program counter is incremented for each instruction executed. The software program can include branches taken according to conditions specified in the program. For a conditional branch, if the condition is satisfied, a branch address is placed in the program counter and sequential execution resumes beginning at the branch address.

The microprocessor-based system, however, typically must respond to the occurrence of events that are not synchronized with respect to the stored software program. For example, data from a peripheral device, such as a modem or a keyboard, may need to be processed soon after the data is acquired. Accordingly, microprocessors are typically provided with an ability to receive one or more interrupt signals activated by one or more peripheral devices. In response to an activated interrupt signal, the microprocessor will interrupt the sequence of instructions that is currently being executed and will begin executing another set of instructions, commonly referred to as an interrupt service routine, appropriate to the activated interrupt.

To begin executing the appropriate interrupt service routine, the address in the program counter is saved and a vector address, also referred to as an interrupt vector, is placed in the program counter. There are generally two techniques for determining the appropriate vector address for executing the interrupt service routine: vectored and auto-vectored. When an interrupt is vectored, the peripheral device provides the starting address of the appropriate interrupt service routine. This starting address is placed in the program counter of the microprocessor. Alternately, the address placed in the program counter can be an address of a location in memory which contains the starting address of the interrupt service routine. When an interrupt is auto-vectored, the vector address points to a predetermined location in memory, regardless of which interrupt is active. This predetermined location is typically the starting address of a software routine commonly referred to as an interrupt handler. The interrupt handler then initiates an interrupt service routine that is appropriate for the active interrupt signal.

Once the microprocessor has executed the interrupt service routine, the program counter is restored such that the execution of the original sequence of instructions resumes.

When two or more interrupt signals are simultaneously pending, the microprocessor must respond to the interrupts in an appropriate priority. Therefore, microprocessor-based systems generally provide an ability to prioritize the interrupt signals. In addition, under certain circumstances, it is desired that the microprocessor ignore one or more of the interrupt signals. For example, the microprocessor may be performing a critical operation that cannot be interrupted. For this reason microprocessors generally include a means for masking interrupts.

An example of a widely utilized microprocessor is the Motorola, Inc. 68000 series processors. The interrupts for a Motorola 68000 series processor are implemented by connecting a hard-wired interrupt signal line from each peripheral device to an interrupt priority encoder. The interrupt priority encoder is a hardware logic circuit which accepts each active interrupt signal and provides only the highest priority active interrupt signal to one of a plurality of interrupt inputs to the Motorola 68000 series processor. The processor then initiates the appropriate interrupt service routine according to the vectored or auto-vectored technique.

A drawback to this technique for implementing the interrupts in the Motorola 68000 series microprocessors is that to change the relative priorities of the interrupt signals, the connections of the hard-wired interrupt signal lines to the interrupt priority encoder have to be re-arranged. Thus, once such a system is configured, the relative priorities among the interrupts cannot practically be altered.

Another example of a commonly utilized microprocessor is the MIPS Technologies, Inc. reduced instruction set computers (RISC), such as the R2000, R3000, R4000, and R6000 processors. The MIPS RISC processor is notified of pending interrupts by setting appropriate bits in a specialized register, referred to as a cause register. The processor then initiates the appropriate interrupt service routine by first executing an interrupt handler. Priority among pending interrupts is determined by the interrupt handler.

A drawback to this technique for implementing the interrupts in the MIPS RISC processors is that to change the relative priorities of the interrupt signals, the interrupt handler has to be altered. Thus, once such a system is configured, the relative priorities among the interrupts cannot practically be altered. In addition, latency in servicing the interrupts is introduced by the time required to access and execute the interrupt handler. In such a system, the latency can reach undesirable levels.

Therefore, what is needed is more readily configurable technique for prioritizing interrupts in a microprocessor-based system.

SUMMARY OF THE INVENTION

The invention is a software configurable technique for prioritizing and masking interrupts in a microprocessor-based system. A plurality of interrupt configuration registers are provided for mapping a corresponding one of a plurality of interrupt signals to an appropriate one of a plurality of interrupt vector address registers and for masking selected ones of the interrupt signals. Each of the plurality of interrupt configuration registers is software configurable to include a bit pattern that identifies one of the plurality of vector address registers or that indicates that the corresponding interrupt signal is to be masked. The plurality of vector address registers are arranged according to a predetermined priority and each of the plurality of vector address registers is software configurable to contain the starting address of an appropriate interrupt service routine for the corresponding interrupt.

Each of the interrupt signals is coupled to an input of a corresponding one of a plurality of de-multiplexers. Each of the plurality of interrupt configuration registers is coupled to the select lines of a corresponding one of the plurality of de-multiplexers. The outputs of each of the plurality of de-multiplexers are combined with corresponding outputs of each other de-multiplexer according to the logical "OR" function by a plurality of logical "OR" gates to provide a plurality of activation signals at the outputs of the logical "OR" gates. Each activation signal is selectively enabled according to a condition of the corresponding interrupt signal. Thus, the de-multiplexers and logical "OR" gates map the interrupt signals to the outputs of the logical "OR" gates according to the contents of the interrupt configuration registers.

Each activation signal corresponds to one of the plurality of vector address registers. A plurality of logical "AND" gates are coupled to receive the activation signals and to allow only the highest priority enabled activation signal to enable the corresponding one of the plurality of vector address registers. The vector address stored in the enabled vector address register is placed on a vector address bus for the microprocessor. The microprocessor then places the vector address in its program counter and executes the appropriate interrupt service routine beginning at the vector address.

Once the highest priority interrupt has been serviced by executing the appropriate interrupt service routine, a next highest priority pending interrupt is serviced until there are no more pending interrupts. Once there are no pending interrupts, the program counter is restored such that the microprocessor resumes executing its original sequence of instructions.

Therefore, according to the present invention, the interrupts are configurable according to the contents of the plurality of interrupt configuration registers and according to the contents of the vector address registers. These contents are relatively easily changed, thus, the present invention provides more readily configurable interrupts in comparison to prior techniques. In addition, the present invention reduces latency in servicing each interrupt by eliminating priority and vector address parsing in an interrupt handler as required prior techniques. Rather, prioritizing each interrupt and providing the appropriate vector address for the interrupt is performed according to the present invention primarily in hardware, resulting in less latency than in prior techniques.

DETAILED DESCRIPTION OF A PREFERRED EMBODIMENT

Figure 1:
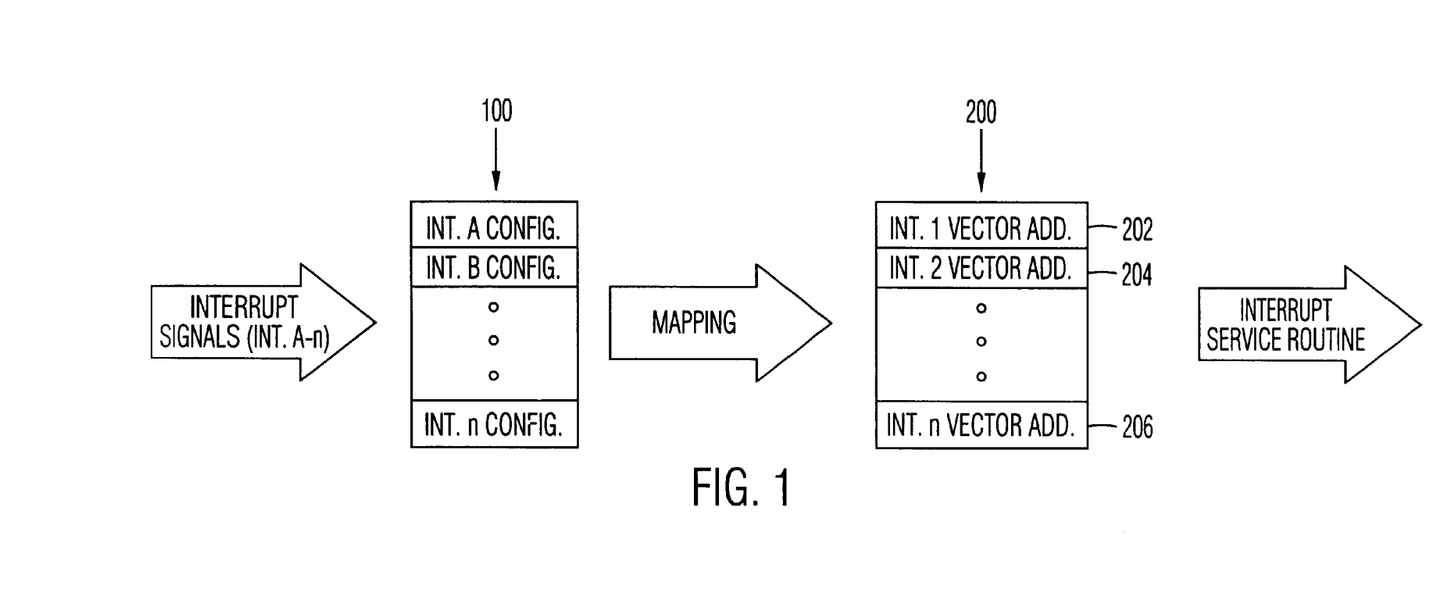
FIG. 1 illustrates a functional block diagram according to the present invention including a plurality of interrupt configuration registers and a plurality of vector address registers.

Referring to FIG. 1, a plurality of interrupt configuration registers 100 and a plurality of vector address registers 200 are provided for responding to interrupt signals in a microprocessor-based system. Each interrupt signal INT. A through INT. n generated by a peripheral device corresponds to one of the plurality of interrupt configuration registers 100. The number of interrupt signals varies depending upon the system implementation. Each of the interrupt configuration registers 100 is configurable by software to include a bit pattern that identifies one of the vector address registers 200 or a bit pattern that indicates that the corresponding interrupt is to be masked (disabled). Accordingly, the interrupt signals INT. A through INT. n are each selectively mapped to an appropriate one of the registers 200 according to the contents of the registers 100.

Each of the plurality of vector address registers 200 contains the starting address of an interrupt service routine appropriate for the corresponding interrupt signal. In a system that utilizes 32 bits to specify memory addresses, each of the registers 200 holds 32 bits, though it will be apparent that for other addressing schemes, the registers 200 can have another size. The vector address registers 200 are arranged according to a predetermined priority. For example, the vector address register 202 is designated the lowest priority, intermediate registers, such as the register 204, having ascending priority levels while the vector address register 206 is designated the highest priority level. It will be apparent, however, that the relative ordering of priorities can be altered.

The number of bits stored by each of the interrupt configuration registers 100 is preferably sufficient to provide a unique bit pattern for each of the vector address registers 200 and to provide a unique bit pattern to indicate a masked interrupt. Thus, if there are up to three interrupt signals, each of the registers 100 preferably hold two bits. One bit pattern, such as 00, indicates that the corresponding interrupt is masked, while the remaining bit patterns 01, 10 and 11, each correspond to one of the vector address registers 200. If there are up to seven interrupt signals, the plurality of interrupt configuration registers 100 preferably each hold three bits. One bit pattern, such as 000, indicates that the corresponding interrupt is masked. Each of the remaining bit patterns, 001 to 111, corresponds to one of the vector address registers 200. Alternately, if there are up to fifteen interrupt signals, each of the plurality of configuration registers preferably holds four bits. It will be apparent that in a system having even more interrupts, more bits are needed.

The following examples illustrate operation of the present invention. Assume a microprocessor-based system must respond to five different interrupt signals designated INT. A through INT. E. Thus, there must be five interrupt configuration registers 100, each of which stores three bits. In addition, there must be five vector addresses, designated A' through E'. For the following examples, the vector addresses A' through E' each correspond to an interrupt having a like letter designation (e.g. the interrupt service routine appropriate for the INT. A has a starting address in memory of Address A').

Figure 2A:
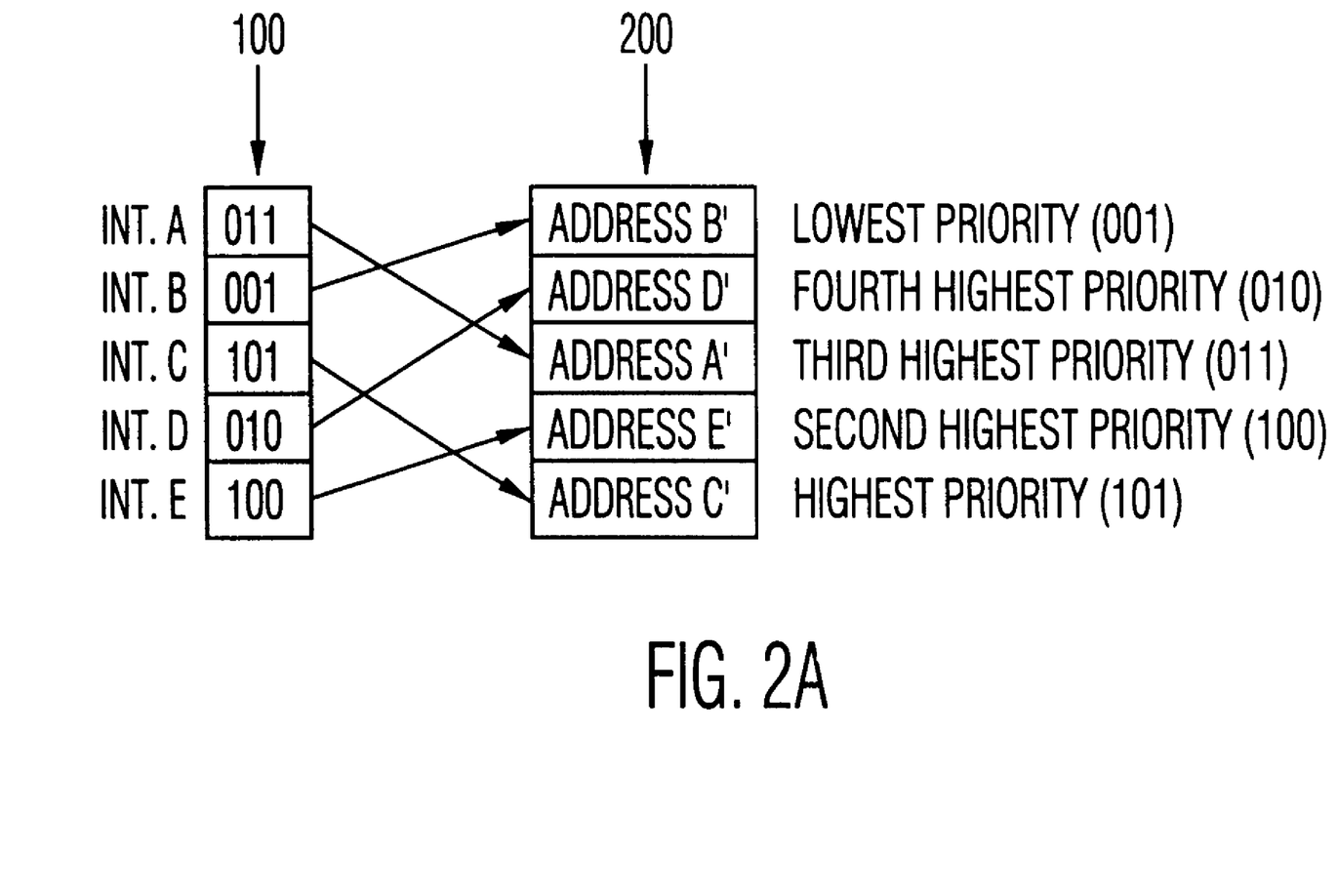
FIGS. 2A–D illustrate examples for assigning priorities and mapping vector addresses to interrupts according to the present invention.

A first example is illustrated in FIG. 2A. Assume it is desired to assign priorities to the interrupts A through E in the following order (highest priority to lowest priority): C, E, A, D, B. Therefore, the interrupt configuration registers 100 and vector address registers 200 are configured as illustrated in FIG. 2A: the bit pattern 101 is placed in the interrupt configuration register corresponding to the interrupt INT. C, indicating that INT. C is to be mapped to the highest priority of the vector address registers 200, while the vector address C' for INT. C is placed in the highest priority vector address register; the bit pattern 100 is placed in the interrupt configuration register corresponding to the interrupt INT. E, indicating that INT. E is to be mapped to the second highest priority of the vector address registers 200, while the vector address E' for INT. E is placed in the second highest priority vector address register; the bit pattern 011 is placed in the interrupt configuration register corresponding to the interrupt INT. A, indicating that INT. A is to be mapped to the third highest priority of the vector address registers 200, while the vector address A' for INT. A is placed in the third highest priority vector address register; the bit pattern 010 is placed in the interrupt configuration register corresponding to the interrupt INT. D, indicating that INT. D is to be mapped to the fourth highest priority of the vector address registers 200, while the vector address D' for INT. D is placed in the fourth highest priority vector address register; the bit pattern 001 is placed in the interrupt configuration register corresponding to the interrupt INT. B, indicating that INT. B is to be mapped to the lowest priority of the vector address registers 200, while the vector address B' for INT. B is placed in the lowest priority vector address register.

According to the example illustrated in FIG. 2A, if an interrupt occurs, the corresponding vector address is supplied to the microprocessor for loading into its program counter. For example, if the interrupt INT. A occurs, the corresponding vector address A' is supplied to the microprocessor. If multiple interrupts are pending, such as the interrupts INT. A and INT. E, then only the vector address of the highest priority pending interrupt is supplied to the microprocessor. In this example, because the interrupt INT. E has a higher priority than the interrupt INT. A, the vector address E' will be supplied to the microprocessor first. Once the interrupt service routine for the interrupt INT. E has been executed, the vector address A' will be supplied to the microprocessor, assuming the interrupt INT. A is still pending.

Figure 2B:
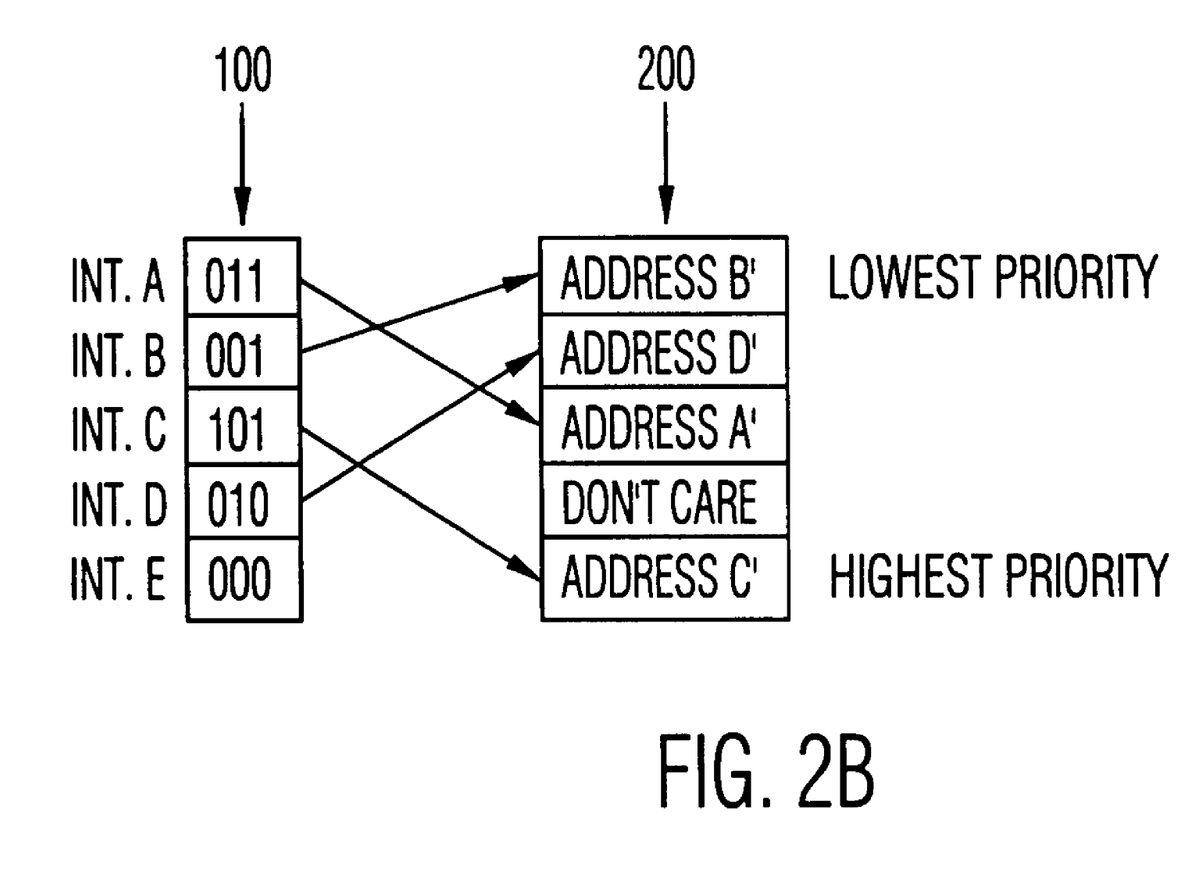

Assume that the bit pattern 000 corresponds to a masked interrupt. It will be apparent, however, that any bit pattern can be selected to correspond to a masked interrupt. If it is desired to mask one or more of the interrupts INT. A through INT. E, the bit pattern in the configuration register corresponding to an interrupt signal to be masked is replaced with the bit pattern: 000. FIG. 2B illustrates such an example. The example illustrated in FIG. 2B is similar to that illustrated in FIG. 2A except that the interrupt INT. E is masked. Note that because the interrupt INT. E is masked, there is no need to provide a corresponding vector address E'. Therefore, even if the interrupt E is active, no corresponding vector address will be provided to the microprocessor. If one or more of the remaining, non-masked, interrupts INT. A through INT. D is active, however, program flow will be interrupted and the appropriate vector address provided to the microprocessor. Any one, or multiple ones, of the interrupt signals A through E can be masked in this manner.

The present invention provides significant flexibility in configuring the interrupts and the relative priorities thereof. The vector address, masking and relative priority for each interrupt can be changed simply by altering the contents of the corresponding ones of either or both of the configuration registers 100 and vector address registers 200.

Figure 2C:
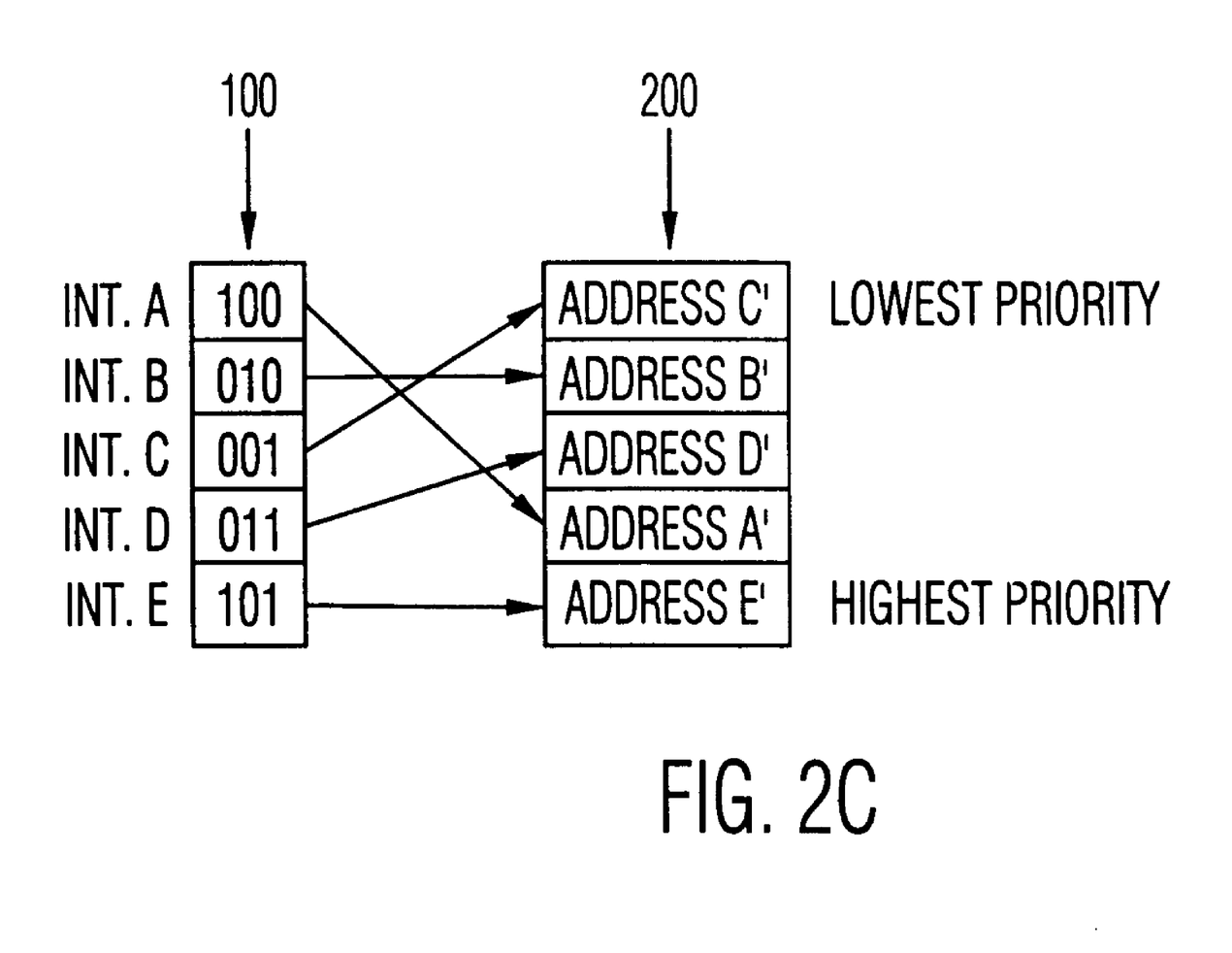

As an example of this flexibility, referring again to FIG. 2A, assume that upon servicing a highest priority interrupt, it is desired to change the relative priorities such that the highest priority interrupt becomes the lowest priority and the remaining interrupts are incremented in priority. This is accomplished according to the present invention by changing the entries in the interrupt configuration registers 100 and the vector address registers 200 as illustrated in FIG. 2C. Note that in FIG. 2A, the interrupt INT. C is mapped to the highest priority location in the vector address registers 200, whereas, in FIG. 2C, the interrupt INT. C is mapped to the lowest priority location in the vector address registers 200. Additionally, in FIG. 2C, each of the interrupts INT. A, INT. B, INT. D, and INT. E has been incremented in priority relative to their positions in FIG. 2A.

Figure 2D:
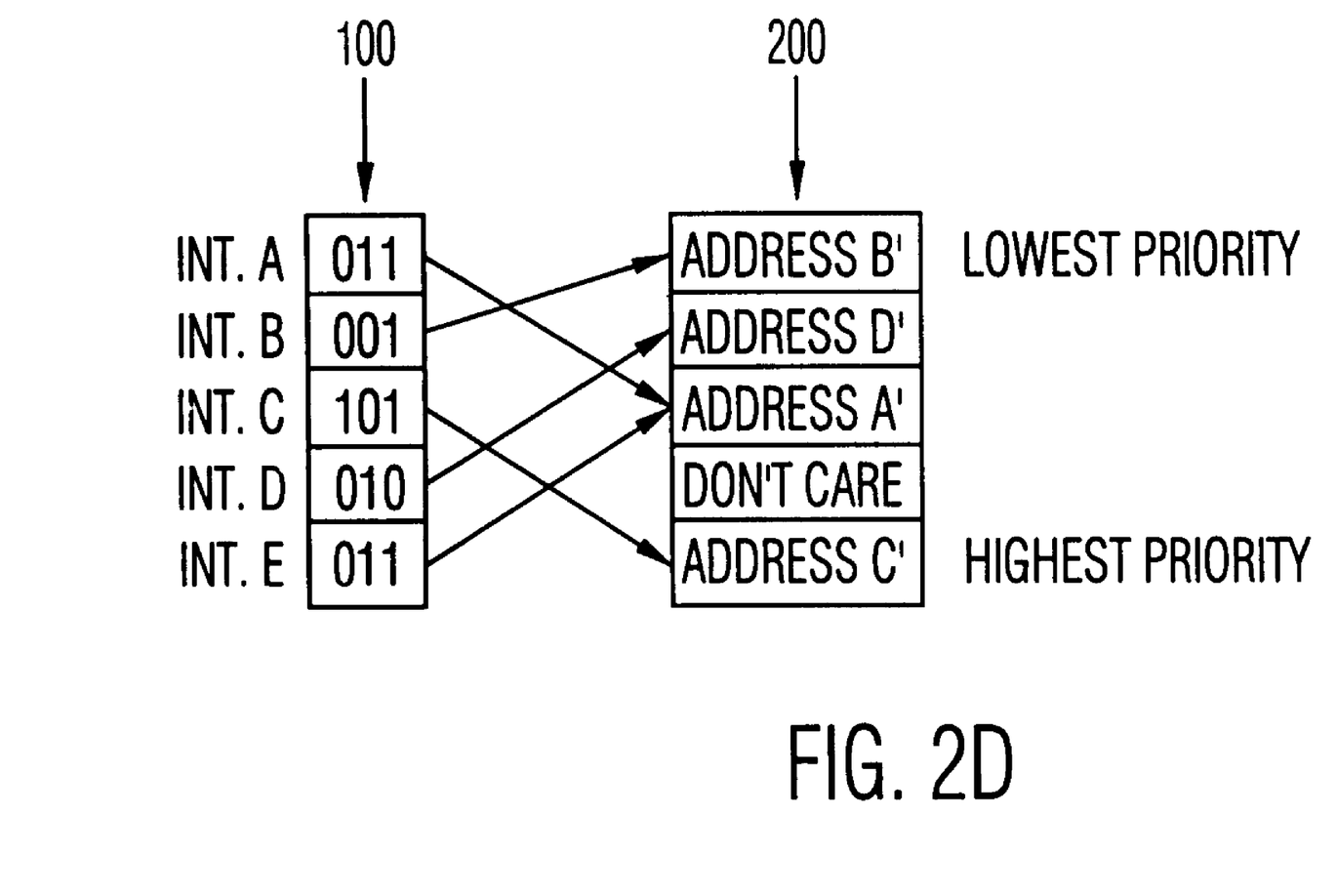

The above examples assume that each interrupt signal is mapped to a unique interrupt service routine, however, it will be apparent that multiple interrupts can be mapped to a single interrupt service routine (or to a single interrupt handler) according to the present invention. FIG. 2D illustrates two interrupt signals mapped to a single vector address. In particular, the interrupt signal INT. A and the interrupt signal INT. E are both mapped to the vector address A'.

Figure 3A:
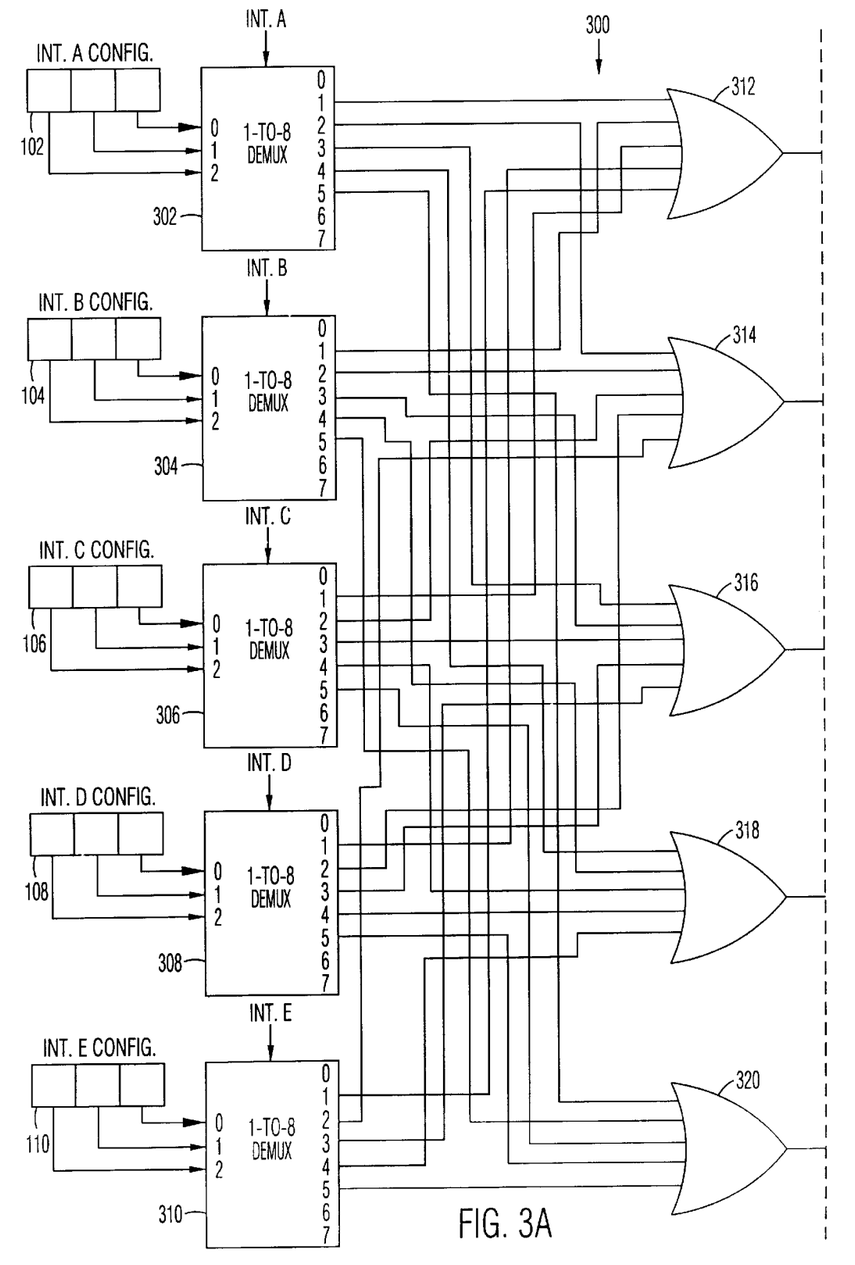
FIG. 3 illustrates a schematic diagram of a circuit for implementing the present invention.
Figure 3B:
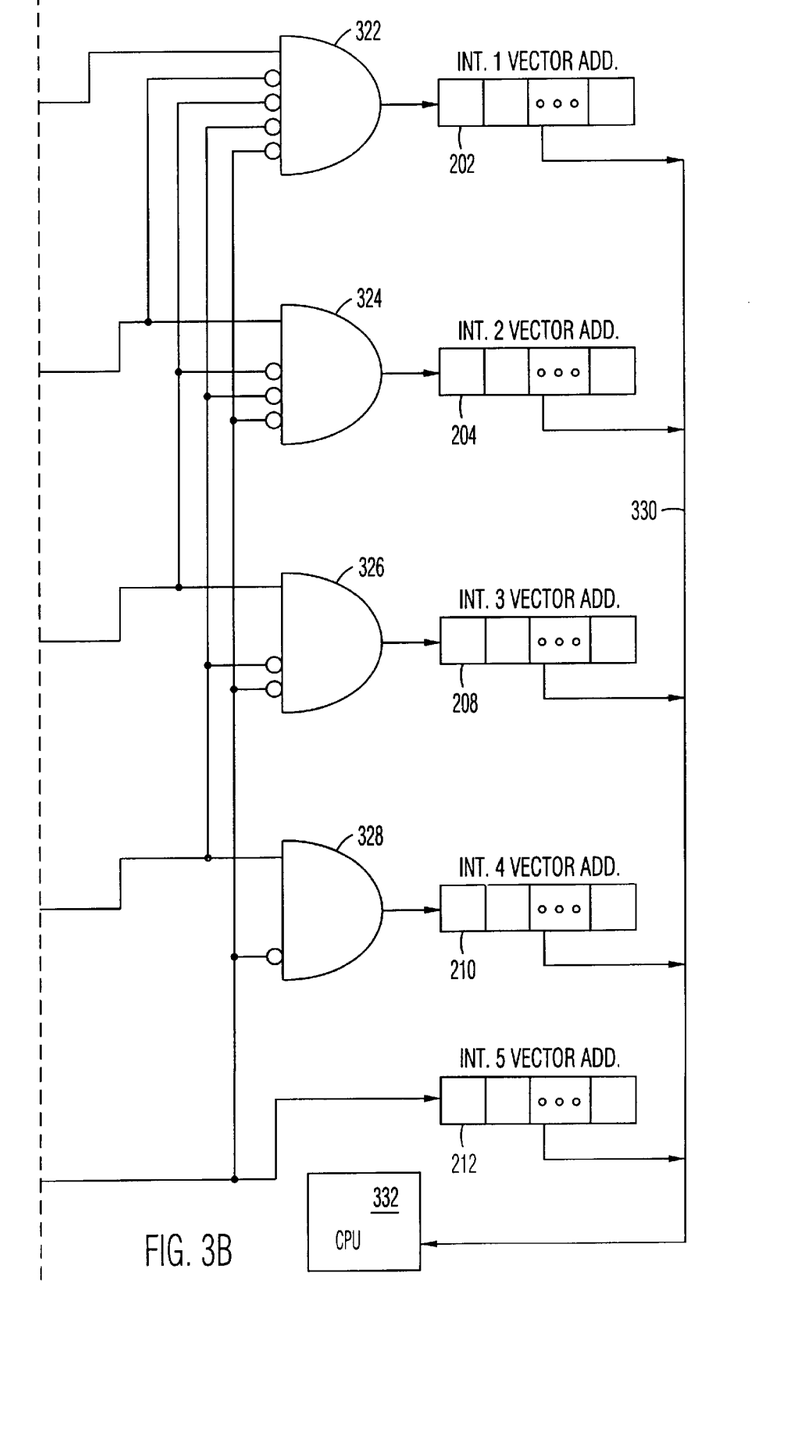

FIG. 3 illustrates a block schematic diagram of a circuit 300 for implementing the present invention. For ease of explanation, the circuit 300 illustrated in FIG. 3 is for a system having five interrupts, INT. A–E, though it will be apparent that the principles disclosed herein can be applied to form a circuit in accordance with the present invention for a system having more or fewer interrupts. The interrupt signal INT. A is coupled to the input of a one-to-eight de-multiplexer 302. A configuration register 102 for the interrupt signal INT. A holds three bits. The three bits of the register 102 are respectively coupled to three select lines of the de-multiplexer 302. The interrupt signal INT. B is coupled to the input of a one-to-eight de-multiplexer 304. A configuration register 104 for the interrupt signal INT. B holds three bits. The three bits of the register 104 are respectively coupled to three select lines of the one-to-eight de-multiplexer 304.

The interrupt signal INT. C is coupled to the input of a one-to-eight de-multiplexer 306. A configuration register 106 for the interrupt signal INT. C holds three bits. The three bits of the register 106 are respectively coupled to three select lines of the de-multiplexer 306. The interrupt signal INT. D is coupled to the input of a one-to-eight multiplexer 308. A configuration register 108 for the interrupt signal INT. D holds three bits. The three bits of the register 108 are respectively coupled to three select lines of the de-multiplexer 308. The interrupt signal INT. E is coupled to the input of a one-to-eight multiplexer 310. A configuration register 110 for the interrupt signal INT. E holds three bits. The three bits of the register 110 are respectively coupled to three select lines of the de-multiplexer 310.

A "1" output of the de-multiplexer 302 is coupled to a first input of a logical "OR" gate 312. A "2" output of the de-multiplexer 302 is coupled to a first input of a logical "OR" gate 314. A "3" output of the de-multiplexer 302 is coupled to a first input of a logical "OR" gate 316. A "4" output of the de-multiplexer 302 is coupled to a first input of a logical "OR" gate 318. A "5" output of the de-multiplexer 302 is coupled to a first input of a logical "OR" gate 320. The "0", "6" and "7" outputs of the de-multiplexer 302 have no connection.

A "1" output of the de-multiplexer 304 is coupled to a second input of the logical "OR" gate 312. A "2" output of the de-multiplexer 304 is coupled to a second input of the logical "OR" gate 314. A "3" output of the de-multiplexer 304 is coupled to a second input of the logical "OR" gate 316. A "4" output of the de-multiplexer 304 is coupled to a second input of the logical "OR" gate 318. A "5" output of the de-multiplexer 304 is coupled to a second input of the logical "OR" gate 320. The "0", "6" and "7" outputs of the de-multiplexer 304 have no connection.

A "1" output of the de-multiplexer 306 is coupled to a third input of the logical "OR" gate 312. A "2" output of the de-multiplexer 306 is coupled to a third input of the logical "OR" gate 314. A "3" output of the de-multiplexer 306 is coupled to a third input of the logical "OR" gate 316. A "4" output of the de-multiplexer 306 is coupled to a third input of the logical "OR" gate 318. A "5" output of the de-multiplexer 306 is coupled to a third input of the logical "OR" gate 320. The "0", "6" and "7" outputs of the de-multiplexer 306 have no connection.

A "1" output of the de-multiplexer 308 is coupled to a fourth input of the logical "OR" gate 312. A "2" output of the de-multiplexer 308 is coupled to a fourth input of the logical "OR" gate 314. A "3" output of the de-multiplexer 308 is coupled to a fourth input of the logical "OR" gate 316. A "4" output of the de-multiplexer 308 is coupled to a fourth input of the logical "OR" gate 318. A "5" output of the de-multiplexer 308 is coupled to a fourth input of the logical "OR" gate 320. The "0", "6" and "7" outputs of the de-multiplexer 308 have no connection.

A "1" output of the de-multiplexer 310 is coupled to a fifth input of the logical "OR" gate 312. A "2" output of the de-multiplexer 310 is coupled to a fifth input of the logical "OR" gate 314. A "3" output of the de-multiplexer 310 is coupled to a fifth input of the logical "OR" gate 316. A "4" output of the de-multiplexer 310 is coupled to a fifth input of the logical "OR" gate 318. A "5" output of the de-multiplexer 310 is coupled to a fifth input of the logical "OR" gate 320. The "0", "6" and "7" outputs of the de-multiplexer 310 have no connection.

An output of the logical "OR" gate 312 is coupled to a first, non-inverted, input of a logical "AND" gate 322. An output of the logical "OR" gate 314 is coupled to a second, inverted, input of the logical "AND" gate 322 and to a first, non-inverted, input of a logical "AND" gate 324. An output of the logical "OR" gate 316 is coupled to a third, inverted, input of the logical "AND" gate 322, to a second, inverted, input of the logical "AND" gate 324 and to a first, non-inverted, input of a logical "AND" gate 326. An output of the logical "OR" gate 318 is coupled to a fourth, inverted, input of the logical "AND" gate 322, to a third, inverted, input of the logical "AND" gate 324, to a second, inverted input of the logical "AND" gate 328 and to a first, non-inverted, input to a logical "AND" gate 328.

An output of the logical "OR" gate 320 is coupled to a fifth, inverted, input of the logical "AND" gate 322, to a fourth, inverted, input of the logical "AND" gate 324, to a third, inverted, logical "AND" gate 326, to a second, inverted input of the logical "AND" gate 328 and coupled to enable a vector address register 212. An output of the logical "AND" gate 322 is coupled to enable a vector address register 202. An output of the logical "AND" gate 324 is coupled is enable a vector address register 204. An output of the logical "AND" gate 326 is coupled is enable a vector address register 208. An output of the logical "AND" gate 328 is coupled is enable a vector address register 210.

The contents of the vector address register 202 are selectively coupled to a vector address bus 330 according to a level of the output of the logical "AND" gate 322. The width of the vector address bus 330 preferably corresponds to the number of bits used by the microprocessor for addressing memory (e.g. 32 bits), though other addressing schemes can be utilized. The contents of the vector address register 204 are selectively coupled to the vector address bus 330 according to a level of the output of the logical "AND" gate 324. The contents of the vector address register 208 are selectively coupled to the vector address bus 330 according to a level of the output of the logical "AND" gate 326.

The contents of the vector address register 210 are selectively coupled to the vector address bus 330 according to a level of the output of the logical "AND" gate 328. The contents of the vector address register 212 are selectively coupled to the vector address bus 330 according to a level of the output of the logical "OR" gate 320. The vector address bus 330 is coupled to a microprocessor 332 for the system to provide appropriate interrupt vector addresses to logic within the microprocessor 332 for implementing a program counter for the microprocessor 332.

For operation of the circuit 300, the configuration registers 102–110 and vector address registers 202–212 are appropriately configured. Preferably, the registers 102–110 and 202–212 are accessible to the microprocessor 332 and are initially configured upon start-up of the microprocessor-based system, such as by a start-up software routine. Once the system is operating, the contents of the registers 102–110 and 202–212 can be altered by software commands or by user input. Alternately, the registers 102–110 and 202–212 are configured by logic circuits external to the microprocessor 332.

For example, assume the registers 102–110 and 202–212 are configured according to the example illustrated in FIG. 2B. Therefore, the interrupt configuration register 102 contains the bit pattern 011; the interrupt configuration register 104 contains the bit pattern 001; the interrupt configuration register 106 contains the bit pattern 101, the interrupt configuration register 108 contains the bit pattern 010; and the interrupt configuration register 110 contains the bit pattern 000. In addition, the vector address register 202 contains the vector address B'; the vector address register 204 contains the vector address D'; the vector address register 208 contains the vector address A'; the contents of the vector address register 210 are a don't care since none of the interrupt signals are mapped to the register 210; and the vector address register 212 is configured with the vector address C'.

Therefore, whenever the interrupt signal INT. A is active, the "3" output of the de-multiplexer 302 is a logical high voltage, resulting in the output of the logical "OR" gate 316 also being a logical high voltage. Whenever the interrupt signal INT. B is active, the "1" output of the de-multiplexer 304 is a logical high voltage, resulting in the output of the logical "OR" gate 312 also being a logical high voltage. Whenever the interrupt signal INT. C is active, the "5" output of the de-multiplexer 306 is a logical high voltage, resulting in the output of the logical "OR" gate 320 being a logical high voltage. Whenever the interrupt signal INT. D is active, the "2" output of the de-multiplexer 308 is a logical high voltage, resulting in the output of the logical "OR" gate 314 being a logical high voltage. Whenever the interrupt signal INT. E is active, the "0" output of the de-multiplexer 310 is a logical high voltage. Because the "0" output has no connection, the interrupt signal INT. E is masked. Accordingly, the configuration of the de-multiplexers 302–310 and logical "OR" gates 312–320 functions as a mapping circuit for appropriately mapping the interrupt signals INT. A–E to the outputs of the logical "OR" gates 312–320 according to the contents of the configuration registers 102–110.

The above example assumes the interrupt signals INT. A–E are active high, level sensitive, signals. If they are active low signals, a inverter is preferably included for each interrupt signal to convert the active low signals to active high signals. If the interrupt signals are edge sensitive, a latch is preferably included for each interrupt signal to convert the edge sensitive signals to level sensitive signals.

The configuration of the logical "AND" gates 322–328 function as a priority encoder circuit to prioritize the interrupt signals. The interrupt mapped to the vector address register 212 is the highest priority and the interrupt mapped to the vector address register 202 is the lowest priority. Accordingly, whenever an interrupt signal mapped to the output of the logical "OR" gate 320 (in the example, the interrupt signal INT. C) is active, the output of the logical "OR" gate 320 will block all the other interrupt signals via the logical "AND" gates 322–328 and will cause the vector address contained in the register 212 (in the example, the vector address C') to be placed on the vector address bus 330.

Assuming none of the higher priority interrupt signals are active, whenever an interrupt signal mapped to one of the outputs of the "OR" gates 312–318 is active, the output of the "OR" respective "OR" gate will block all the lower priority interrupt signals via the logical "AND" gates associated with the lower priority interrupt signals and will cause the vector address corresponding to the highest priority active interrupt signal to be placed on the vector address bus 330.

Once the highest priority interrupt has been serviced by executing the appropriate interrupt service routine, the interrupt signal is disabled and the next highest priority pending interrupt is serviced until there are no more pending interrupts. Once there are no pending interrupts, the program counter is restored such that the microprocessor resumes executing the software program.

Therefore, according to the present invention, the interrupt signals are configurable according to the contents of the of the plurality of interrupt configuration registers 102–110 and according to the contents of the vector address registers 202–212. These contents are relatively easily changed, thus, the present invention provides more readily configurable interrupts in comparison to prior techniques.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to one of ordinary skill in the art that the device of the present invention could be implemented in several different ways and the apparatus disclosed above is only illustrative of the preferred embodiment of the invention and is in no way a limitation. For example, it will be apparent that modifications or additions can be made to the apparatus illustrated in FIG. 3. In particular, logic circuits can be included which latch the interrupt signals INT. A, INT. B, INT. C, INT. D and INT. E and which control whether each interrupt signal is leading edge, trailing edge or level sensitive. Further, alternate techniques for masking the interrupts can be implemented, such as by selectively controlling a chip select pin for each of the de-multiplexers 302, 304, 306, 308 and 310.

What is claimed is:

1. A method for responding to active ones of a plurality of interrupt signals in a microprocessor-based system, the method comprising the steps of:
   a. receiving the active ones of the plurality of interrupt signals;
   b. mapping each of the active ones of the plurality of interrupt signals, according to contents of a respective one of a first plurality of registers, to one of a second plurality of registers, wherein each register of the second plurality has a corresponding relative priority specified by the respective one of the first plurality of registers and contains a vector address for the corresponding interrupt signal; and
   c. supplying the vector address for each of the active ones of the interrupt signals to the microprocessor according to the relative priority of each of the active ones of the interrupt signals.

2. The method according to claim 1 further comprising a step of altering relative priorities of the interrupt signals by altering the contents of the first and second plurality of registers.

3. The method according to claim 1 further comprising a step of masking a selected one of the plurality of interrupts according to the contents of the respective one of the first plurality of registers.

4. The method according to claim 1 wherein one vector address corresponds to more than one interrupt signal.

5. An apparatus for responding to active ones of a plurality of interrupt signals in a microprocessor-based system, the apparatus comprising:
   a. a first plurality of registers;
   b. a mapping circuit coupled to the first plurality of registers for mapping each of the active ones of the plurality of interrupt signals to a plurality of activation signals based on priority according to contents of a respective one of a first plurality of registers;
   c. a priority encoding circuit coupled to the mapping circuit for blocking all but a highest priority activation signal of the plurality of activation signals; and
   d. a second plurality of registers coupled to receive the plurality of activation signals, wherein each register of the second plurality contains a vector address for the corresponding activation signal, the second plurality of registers for providing to the microprocessor the vector address corresponding to the highest priority activation signal.

6. The apparatus according to claim 5 wherein relative priorities of the interrupt signals are altered by altering the contents of the first and second plurality of registers.

7. The apparatus according to claim 5 wherein selected ones of the plurality of interrupts are masked by the mapping circuit according to the contents of the respective one of the first plurality of registers.

8. The apparatus according to claim 5 wherein one vector address corresponds to more than one interrupt signal.

9. An apparatus for responding to active ones of a plurality of interrupt signals in a microprocessor-based system, the apparatus comprising:
   a. a first plurality of registers for storing a relative priority value, each register of the first plurality corresponding to one of the plurality of interrupt signals;
   b. a plurality of de-multiplexers, each de-multiplexer having a plurality of select lines coupled to a respective one of the first plurality of registers to receive the relative priority value, an input coupled to receive the corresponding one of the interrupt signals, and a plurality of outputs;
   c. a plurality of logical OR gates, each logical OR gate having a plurality of inputs and an output, wherein each input of each logical OR gate is coupled to one of the plurality of outputs of each de-multiplexer, wherein the outputs of the logical OR gates form a plurality of activation signals;
   d. a priority encoding circuit coupled to the plurality of OR gates for blocking all but a highest priority enabled activation signal of the plurality of activation signals; and e. a second plurality of registers coupled to receive the plurality of activation signals, wherein each register of the second plurality contains a vector address for the corresponding activation signal, the second plurality of registers for providing to the microprocessor the vector address corresponding to the highest priority enabled activation signal.

10. The apparatus according to claim 9 wherein the priority encoding circuit comprises a plurality of logical AND gates, each logical AND gate corresponding to one of the activation signals other than a highest priority of the activation signals, wherein each logical AND gate is coupled to perform a logical AND function on a logic level of the corresponding one of the activation signals and on an inverted logic level of each activation signal having a priority higher than the corresponding one of the activation signals and wherein an output of each logical AND gate and the highest priority of the activation signals are each coupled to enable a corresponding one of the second plurality of registers to provide its vector address to the microprocessor.

11. The apparatus according to claim 9 wherein relative priorities of the interrupt signals are altered by altering the contents of the first and second plurality of registers.

12. The apparatus according to claim 9 wherein selected ones of the plurality of interrupts are masked by appropriately configuring the contents of the respective one of the first plurality of registers.

13. The apparatus according to claim 9 wherein selected ones of the plurality of interrupts are masked by appropriately configuring the contents of the respective one of the first plurality of registers to select an output of the corresponding de-multiplexer which is not connected to one of the plurality of logical OR gates.

14. The apparatus according to claim 9 wherein one vector address corresponds to more than one interrupt signal.

* * * * *